(12) United States Patent
Wentink (10) Patent No.: US 8,446,933 B2
(45) Date of Patent: May 21, 2013

(54) DIRECT LINK RELAY IN A WIRELESS NETWORK

(75) Inventor: Menzo Wentink, Ultrecht (NL)

(73) Assignee: Intellectual Ventures I LLC, Wilmington, DE (US)

( * ) Notice: Subject to any disclaimer, the term of this patent is extended or adjusted under 35 U.S.C. 154(b) by 30 days.

(21) Appl. No.: 13/271,394

(22) Filed: Oct. 12, 2011

(65) Prior Publication Data

US 2012/0026895 A1    Feb. 2, 2012

Related U.S. Application Data

(63) Continuation of application No. 10/880,367, filed on Jun. 30, 2004, now Pat. No. 8,050,360, which is a continuation-in-part of application No. 10/353,391, filed on Jan. 29, 2003, now Pat. No. 6,791,962.

(60) Provisional application No. 60/515,701, filed on Oct. 31, 2003, provisional application No. 60/388,569, filed on Jun. 12, 2002.

(51) Int. Cl.
    *H04B 1/38*    (2006.01)
(52) U.S. Cl.
    USPC .......... 375/217; 375/219; 375/220; 375/221; 375/222
(58) Field of Classification Search ............ 375/315, 375/309, 219, 220, 221, 222; 370/243, 252, 370/218, 231, 349, 338, 350, 401; 455/522, 455/62, 67.4, 69

See application file for complete search history.

(56) References Cited

U.S. PATENT DOCUMENTS

| | | | |
|---|---|---|---|
| 5,371,734 | A | 12/1994 | Fischer |
| 5,463,659 | A | 10/1995 | Nealon et al. |
| 5,465,398 | A | 11/1995 | Flammer |
| 5,487,069 | A | 1/1996 | O'Sullivan et al. |
| 5,537,414 | A | 7/1996 | Takiyasu et al. |
| 5,636,220 | A | 6/1997 | Vook et al. |
| 5,752,201 | A | 5/1998 | Kivari |
| 5,768,531 | A | 6/1998 | Lin |
| 5,812,968 | A | 9/1998 | Hassan et al. |

(Continued)

FOREIGN PATENT DOCUMENTS

| | | |
|---|---|---|
| DE | 102 28 342 | 9/2003 |
| EP | 1 168 676 | 1/2002 |
| WO | WO-2004/077920 | 9/2004 |

OTHER PUBLICATIONS 802.11 Wireless Networks: The Definitive Guide. O'Reilly & Associates, 2002. pp. 1-14.

(Continued)

*Primary Examiner* — Shuwang Liu
*Assistant Examiner* — Helene Tayong (57) ABSTRACT

Disclosed herein are exemplary techniques for power conservation in a wireless network. A wireless device identifies another wireless device suitable to act as a relay node. Uplink information is transmitted to the other wireless device, which is in turn relayed to an access point for transmission to its destination. Downlink information may be transmitted directly from the access point to the wireless device. The use of a relay node may reduce transmit power consumption as the relay node may be closer to, or support a higher transmit rate, than the access point with which the wireless device is associated.

15 Claims, 3 Drawing Sheets

U.S. PATENT DOCUMENTS

| | | | | |
|---|---|---|---|---|
| 5,822,682 | A * | 10/1998 | Schroderus et al. | 455/63.3 |
| 5,862,142 | A | 1/1999 | Takiyasu et al. | |
| 5,991,287 | A | 11/1999 | Diepstraten et al. | |
| 5,995,849 | A | 11/1999 | Williams et al. | |
| 5,999,127 | A | 12/1999 | Dezelan | |
| 6,047,178 | A | 4/2000 | Frlan | |
| 6,052,557 | A | 4/2000 | Kinnunen et al. | |
| 6,084,865 | A | 7/2000 | Dent | |
| 6,119,014 | A | 9/2000 | Alperovich et al. | |
| 6,192,230 | B1 | 2/2001 | Van Bokhorst et al. | |
| 6,208,627 | B1 | 3/2001 | Menon et al. | |
| 6,222,842 | B1 | 4/2001 | Sasyan et al. | |
| 6,292,672 | B1 | 9/2001 | Chavez, Jr. | |
| 6,301,609 | B1 | 10/2001 | Aravamudan et al. | |
| 6,339,713 | B1 | 1/2002 | Hansson et al. | |
| 6,343,083 | B1 | 1/2002 | Mendelson et al. | |
| 6,347,095 | B1 | 2/2002 | Tang et al. | |
| 6,360,277 | B1 | 3/2002 | Ruckley et al. | |
| 6,415,146 | B1 | 7/2002 | Capece | |
| 6,424,820 | B1 | 7/2002 | Burdick et al. | |
| 6,430,604 | B1 | 8/2002 | Ogle et al. | |
| 6,463,290 | B1 | 10/2002 | Stilp et al. | |
| 6,470,058 | B1 | 10/2002 | Michalski et al. | |
| 6,484,027 | B1 | 11/2002 | Mauney et al. | |
| 6,487,180 | B1 | 11/2002 | Borgstahl et al. | |
| 6,496,694 | B1 | 12/2002 | Menon et al. | |
| 6,507,739 | B1 | 1/2003 | Gross et al. | |
| 6,525,690 | B2 | 2/2003 | Rudow et al. | |
| 6,529,748 | B1 | 3/2003 | Bruner | |
| 6,539,232 | B2 | 3/2003 | Hendrey et al. | |
| 6,542,748 | B2 | 4/2003 | Hendrey et al. | |
| 6,542,749 | B2 | 4/2003 | Tanaka et al. | |
| 6,542,750 | B2 | 4/2003 | Hendrey et al. | |
| 6,574,266 | B1 | 6/2003 | Haartsen | |
| 6,580,704 | B1 | 6/2003 | Wellig et al. | |
| 6,594,666 | B1 | 7/2003 | Biswas et al. | |
| 6,618,005 | B2 | 9/2003 | Hannah et al. | |
| 6,625,456 | B1 | 9/2003 | Busso et al. | |
| 6,631,271 | B1 | 10/2003 | Logan | |
| 6,665,520 | B2 | 12/2003 | Romans | |
| 6,744,743 | B2 | 6/2004 | Walton et al. | |
| 6,759,956 | B2 | 7/2004 | Menard et al. | |
| 6,763,240 | B1 | 7/2004 | Chambers et al. | |
| 6,778,515 | B2 | 8/2004 | Bolgiano et al. | |
| 6,785,251 | B2 | 8/2004 | Bolgiano et al. | |
| 6,788,688 | B2 | 9/2004 | Trebes, Jr. | |
| 6,791,962 | B2 | 9/2004 | Wentink | |
| 6,795,701 | B1 | 9/2004 | Baker et al. | |
| 6,799,056 | B2 | 9/2004 | Curley et al. | |
| 6,810,246 | B1 | 10/2004 | Kalofonos et al. | |
| 6,826,162 | B2 | 11/2004 | Haines et al. | |
| 6,842,460 | B1 | 1/2005 | Olkkonen et al. | |
| 6,904,055 | B2 | 6/2005 | Pichna et al. | |
| 6,925,283 | B1 | 8/2005 | Kraiem et al. | |
| 6,968,179 | B1 | 11/2005 | De Vries | |
| 6,978,151 | B2 | 12/2005 | Choi et al. | |
| 6,985,461 | B2 | 1/2006 | Singh | |
| 7,068,615 | B2 | 6/2006 | Niesen | |
| 7,095,722 | B1 * | 8/2006 | Walke et al. | 370/315 |
| 7,133,909 | B2 | 11/2006 | Bahl | |
| 7,212,827 | B1 | 5/2007 | Veschl | |
| 7,233,792 | B2 | 6/2007 | Chang | |
| 7,245,592 | B2 | 7/2007 | Soomro et al. | |
| 7,251,235 | B2 | 7/2007 | Wentink | |
| 7,260,392 | B2 * | 8/2007 | Kitchin | 455/432.1 |
| 7,277,692 | B1 | 10/2007 | Jones et al. | |
| 7,308,202 | B2 | 12/2007 | Roes et al. | |
| 7,359,727 | B2 | 4/2008 | Tsien et al. | |
| 7,421,466 | B2 | 9/2008 | Haines | |
| 7,450,550 | B2 | 11/2008 | Jin | |
| 7,508,799 | B2 | 3/2009 | Sumner et al. | |
| 7,545,771 | B2 | 6/2009 | Wentink et al. | |
| 2001/0031626 | A1 | 10/2001 | Lindskog et al. | |
| 2002/0025839 | A1 | 2/2002 | Usui | |
| 2002/0087724 | A1 | 7/2002 | Datta et al. | |
| 2002/0159544 | A1 | 10/2002 | Karaoguz | |
| 2002/0168040 | A1 | 11/2002 | Coffey | |
| 2002/0168993 | A1 | 11/2002 | Choi et al. | |
| 2002/0172186 | A1 | 11/2002 | Larsson | |
| 2002/0191573 | A1 | 12/2002 | Whitehill et al. | |
| 2003/0010524 | A1 | 1/2003 | Connor | |
| 2003/0036354 | A1 | 2/2003 | Lee et al. | |
| 2003/0063589 | A1 | 4/2003 | Haines et al. | |
| 2003/0096576 | A1 | 5/2003 | Salonidis et al. | |
| 2003/0126213 | A1 | 7/2003 | Betzler | |
| 2003/0140084 | A1 | 7/2003 | D'Angelo | |
| 2003/0142641 | A1 | 7/2003 | Sumner et al. | |
| 2003/0185241 | A1 | 10/2003 | Lu et al. | |
| 2003/0186703 | A1 | 10/2003 | Cromer et al. | |
| 2003/0210658 | A1 | 11/2003 | Hernandez et al. | |
| 2003/0220765 | A1 * | 11/2003 | Overy et al. | 702/158 |
| 2003/0232598 | A1 | 12/2003 | Aljadeff et al. | |
| 2004/0048609 | A1 | 3/2004 | Kosaka | |
| 2004/0056901 | A1 | 3/2004 | March et al. | |
| 2004/0077920 | A1 | 4/2004 | Snyder | |
| 2004/0078598 | A1 | 4/2004 | Barber et al. | |
| 2004/0095907 | A1 | 5/2004 | Agee et al. | |
| 2004/0125775 | A1 | 7/2004 | Rios | |
| 2004/0125776 | A1 | 7/2004 | Haugli et al. | |
| 2004/0127214 | A1 | 7/2004 | Reddy et al. | |
| 2004/0147249 | A1 | 7/2004 | Wentink | |
| 2004/0184456 | A1 | 9/2004 | Binding et al. | |
| 2004/0192413 | A1 | 9/2004 | Frank | |
| 2004/0203698 | A1 | 10/2004 | Comp | |
| 2004/0236850 | A1 | 11/2004 | Krumm et al. | |
| 2004/0242154 | A1 | 12/2004 | Takeda et al. | |
| 2004/0246934 | A1 | 12/2004 | Kim | |
| 2005/0030976 | A1 | 2/2005 | Wentink | |
| 2005/0122927 | A1 | 6/2005 | Wentink | |
| 2005/0135305 | A1 | 6/2005 | Wentink | |
| 2005/0157674 | A1 | 7/2005 | Wentink | |
| 2005/0265305 | A1 * | 12/2005 | Furukawa et al. | 370/349 |
| 2006/0148406 | A1 | 7/2006 | Strater et al. | |
| 2007/0077894 | A1 | 4/2007 | Zhang et al. | |
| 2008/0095126 | A1 | 4/2008 | Mahany et al. | |

OTHER PUBLICATIONS

A. Soomro and S. Choi Philips Research USA, Proposal to Add Link Margin Field in Ieee 802.11h Submission, Sep. 2001, Slides 9-14.

Advisory Action for U.S. Appl. No. 10/977,470, mailed Dec. 3, 2008.

Advisory Action on U.S. Appl. No. 11/035,065, mailed Mar. 26, 2010.

ANSI/IEEE Std. 802.11, Part 11: Wireless LAN Medium Access Control (MAC) and Physical Layer (PHY) Specification, pp. 1-513, 1999.

Communication from the European Patent Office for EP Application 04794757.7, dated Jul. 28, 2009.

Donovan, Jeremy, "Location awareness beyond E911," EE Times, Jun. 9, 2003, 1 page.

ESTRI TR 101 683 V1.1.1, Broadband Radio Access Networks; HIPERLAN Type 2; System Overview, pp. 1-19, 2000.

Final Office Action for U.S. Appl. No. 10/977,469, mailed Aug. 8, 2008.

Final Office Action on U.S. Appl. No. 10/977,490, mailed Jan. 21, 2010.

Final Office Action on U.S. Appl. No. 10/880,366, mailed Sep. 11, 2009.

Final Office Action on U.S. Appl. No. 10/880,367, mailed Jan. 4, 2008.

Final Office Action on U.S. Appl. No. 10/880,367, mailed Jun. 22, 2009.

Final Office Action on U.S. Appl. No. 10/880,370, mailed Nov. 3, 2006.

Final Office Action on U.S. Appl. No. 10/977,470, mailed Jul. 17, 2008.

Final Office Action on U.S. Appl. No. 10/977,490, mailed Dec. 12, 2007.

Final Office Action on U.S. Appl. No. 10/977,490, mailed Mar. 13, 2009.

Final Office Action on U.S. Appl. No. 11/035,065, Mailed Jan. 21, 2009.

Final Office Action on U.S. Appl. No. 11/035,065, mailed Jan. 22, 2010.

Final Office action on U.S. Appl. No. 12/460,974, mailed Jan. 27, 2011.
Ho et al., MediaPlex-An IEEE 802.11 Enhanced Protocol for QoS-Driven Wireless LANS, IEEE pp. 1-25, Nov. 3, 2000.
IEEE Standard 802.11h Amendment 5: Spectrum and transmit power management extensions in the 5 GHz band in Europe, published Oct. 14, 2003, IEEE, 175 pages.
IEEE STD 802.11e/D3.0, Part 11: Wireless Access Control (MAC) and Physical Layer (PHY) Specifications: Medium Access Control (MAC) Enhancements for Quality of Service (QoS), IEEE, 140 pages, 2002.
International Preliminary Report on Patentability for PCT/US2004/033487, issued May 1, 2006.
International Preliminary Report on patentability for PCT/US2005/001303, issued Nov. 29, 2006.
International Search Report for PCT/US2004/033487, mailed Feb. 2, 2005.
Kammerman et al, WaveLan-II: A High-Performance Wireless LAN for the Unlicensed Band, Bell Labs Technical Journal, pp. 118-133, 1997.
Kandala et al., "Suggested Changes to Normative Text of WARP," IEEE,pp. 1-11, Jun. 2002.
Kitchen, Duncan, "Wireless Address Resolution Protocol," IEEE 802.11-02/016r0, Jan. 14, 2002, pp. 1-13.
Ni et al., QoS Issues and Enhancements for IEEE 802.11 Wireless LAN, INRIA, pp. 1-34, Nov. 2002.
Non-Final Office Action for U.S. Appl. No. 10/880,366, mailed Jan. 12, 2010.
Non-Final Office Action for U.S. Appl. No. 10/977,470, mailed Feb. 26, 2009.
Non-Final Office Action for U.S. Appl. No. 10/977,470, mailed Jan. 14, 2008.
Non-Final Office Action on U.S. Appl. No. 10/977,490, mailed Jun. 29, 2009.
Non-Final Office Action on U.S. Appl. No. 10/880,325, mailed Mar. 16, 2007.
Non-Final Office Action on U.S. Appl. No. 10/880,366, mailed Feb. 20, 2009.
Non-final Office Action on U.S. Appl. No. 10/880,367, mailed Jan. 21, 2011.
Non-Final Office Action on U.S. Appl. No. 10/880,367, mailed Apr. 30, 2008.
Non-Final Office Action on U.S. Appl. No. 10/880,367, mailed Dec. 31, 2008.
Non-Final Office Action on U.S. Appl. No. 10/880,367, mailed Jul. 11, 2007.
Non-Final Office Action on U.S. Appl. No. 10/880,367, mailed Sep. 15, 2009.
Non-Final Office Action on U.S. Appl. No. 10/880,370, mailed Apr. 6, 2006.
Non-Final Office Action on U.S. Appl. No. 10/977,469, mailed Jan. 9, 2008.
Non-Final Office Action on U.S. Appl. No. 10/977,490, mailed Sep. 14, 2011.
Non-Final Office Action on U.S. Appl. No. 10/977,490, mailed Apr. 23, 2008.
Non-Final Office Action on U.S. Appl. No. 10/977,490, mailed Feb. 28, 2007.
Non-Final Office Action on U.S. Appl. No. 10/977,490, mailed Jul. 23, 2007.
Non-Final Office Action on U.S. Appl. No. 11/035,065, mailed Apr. 1, 2008.
Non-Final Office Action on U.S. Appl. No. 11/035,065, mailed Sep. 23, 2009.
Notice of Allowance for U.S. Appl. No. 10/353,391, mailed Feb. 10, 2004.
Notice of Allowance for U.S. Appl. No. 10/880,370, mailed Jun. 12, 2007.
Notice of Allowance for U.S. Appl. No. 10/977,469, mailed Feb. 10, 2009.
Notice of Allowance of U.S. Appl. No. 10/880,367, mailed Mar. 8, 2010.
Notice of Allowance on U.S. Appl. No. 10/880,366, mailed Nov. 26, 2010.
Notice of Allowance on U.S. Appl. No. 10/880,366, mailed May 28, 2010.
Notice of Allowance on U.S. Appl. No. 10/880,367, mailed Jul. 21, 2011.
Notice of Allowance on U.S. Appl. No. 10/977,470, mailed Mar. 31, 2010.
Notice of Allowance on U.S. Appl. No. 12/460974, mailed Sep. 21, 2011.
Notice of Allowanceon U.S. Appl. No. 10/977,470, mailed Jan. 6, 2011.
Non-Final Office Action on U.S. Appl. No. 12/460,974, mailed Mar. 24, 2010.
Palm, Palm: Providing Fluid Connectivity in a Wireless World, 2002, 10 pages.
PanGoNetworks, PanGo "Overview", Intelligent Wireless, Copyright 2003, 1 page.
PanGoNetworks, PanGo "Proximity Platform," Intelligent Wireless, Copyright 2003, 2 pages.
PanGoNetworks, PanGo Mobile Applications Suite, Intelligent Wireless, Copyright 2003, 2 pages.
PanGoNetworks, PanGo Technology, How it Works,, Intelligent Wireless, Copyright 2003, 1 page.
Wentink, "Direct Stream Request Protocol (DSRP)," IEEE, pp. 1-16, Jul. 2002.
Final Office Action on U.S. Appl. No. 10/977,490, mailed Mar. 5, 2012.

* cited by examiner

DIRECT LINK RELAY IN A WIRELESS NETWORK

CROSS-REFERENCE TO RELATED PATENT APPLICATIONS

This application is a Continuation of U.S. application Ser. No. 10/880,367, filed Jun. 30, 2004, which is a Continuation-In-Part of U.S. application Ser. No. 10/353,391, filed Jan. 29, 2003, now U.S. Pat. No. 6,791,962, issued Sep. 14, 2004, which claims priority from U.S. Provisional Application 60/388,569, filed Jun. 12, 2002, the entirety of which is incorporated by reference herein. U.S. application Ser. No. 10/880,367 claims the benefit of U.S. Provisional Application 60/515,701, filed Oct. 31, 2003, the entirety of which is incorporated by reference herein.

FIELD OF THE INVENTION

The present invention relates generally to power management in wireless networks and more particularly to economizing transmit power consumption used by a wireless device.

BACKGROUND OF THE INVENTION

Various wireless standards, such as Institute of Electrical and Electronics Engineers (IEEE) standards 802.11a/b/c/e/g/i (referred to collectively as IEEE 802.11), provide for wireless connectivity between wireless devices, such as, for example, between a wireless station and an access point connected to an infrastructure network. These wireless standards typically provide processes for managing the power consumption of the wireless devices in an attempt to minimize the power consumed by the wireless devices, which at times may rely on battery sources for power having a limited supply of power.

One technique frequently used to minimize the power consumption of a wireless device includes increasing the transmission rate (also referred to as the physical rate) of the wireless device. It will be appreciated that increasing the transmission rate reduces the power consumption as the time needed to transmit information is reduced, thereby reducing the duration that the antenna of the wireless device is active while transmitting the signal representative of the information. However, the maximum transmission rate supportable between wireless devices may be limited for any number of reasons, such as, for example, the distance between wireless devices, the presence of noise or other interference, the individual capabilities of the wireless devices, and the like.

In addition to, or instead of, implementing the maximum supportable transmission rate between wireless devices, a reduction in the transmit power used by a wireless device may be performed to further reduce the power consumption of the wireless device. The degree to which the transmit power of a transmitting wireless station may be reduced generally is related to the link margin of a receiving wireless device, where the link margin typically represents a ratio of the actual received signal power to the minimum received signal power desired or acceptable by the receiving station. Thus, the transmitting station, in theory, could reduce its transmit power by an amount up to the link margin of the receiving wireless device without violating the minimum received signal power requirement of the receiving wireless device. However, even if taking the link margin into account, the degree to which the transmit power may be reduced is still dependent largely on the distance between the wireless devices.

Accordingly, improved techniques for economizing the transmit power of a transmitting wireless device would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

The present invention is directed to a method including receiving, at the first wireless device, uplink information from the second wireless device via a direct wireless link between the first and second wireless device, wherein a destination of the uplink information includes a networked device communicable with the access point, and relaying at least a portion of the uplink information from the first wireless device to the access point for transmission to the networked device in a wireless network.

A further aspect of the present invention is a method including identifying a first wireless device capable of relaying at least a portion of uplink information from a second wireless device to the access point, the uplink information having as a destination a networked device communicable with the access point establishing a direct wireless link between the first wireless device and the second wireless device, and transmitting at least a portion of the uplink information from the second wireless device to the first wireless device via the direct wireless link for relay to the access point in a wireless network.

A further aspect of the present invention is a wireless device including a transceiver adapted to receive uplink information from another wireless device via a direct wireless link with the other wireless device, wherein the uplink information has as a destination a networked device communicable with an access point, and the transceiver further adapted to transmit at least a portion of the uplink information to the access point for transmission to the networked device.

A further aspect of the present invention is a wireless device including a transceiver, circuit means for identifying another wireless device capable of relaying at least a portion of uplink information from the wireless device to an access point, the uplink information having a networked device operably connected to the access point as a destination, communication means for establishing a direct wireless link with the other wireless device; and transmitter means for transmitting, via the transceiver, the uplink information to the other wireless device via the direct wireless link for relay to the access point.

A further aspect of the present invention is a wireless system including a first wireless device and a second wireless device in communication with to an access point. Also, the first wireless device is adapted to identify the second wireless device as capable of relaying at least a portion of uplink information to the access point, the uplink information having a networked device operably connected to the access point as a destination, and transmit the uplink information to the second wireless device via a direct wireless link between the first and second wireless devices. Also, the second wireless device is adapted to relay at least a portion of the uplink information to the access point for transmission to the networked device.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DETAILED DESCRIPTION OF THE PREFERRED EMBODIMENTS

The following description is intended to convey a thorough understanding of the present invention by providing a number of specific embodiments and details involving the minimization of the transmit power used by a wireless device by relaying frames to an access point via another wireless device. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

For ease of illustration, the various techniques of the present invention are discussed below in the context of IEEE 802.11-based wireless networking. However, those skilled in the art, using the teachings provided herein, may advantageously implement the disclosed techniques in other wireless networks. Accordingly, reference to techniques and components specific to IEEE 802.11, such as an 802.11-specific frame format, applies also to the equivalent technique or component in other wireless network standards unless otherwise noted.

Figure 1:
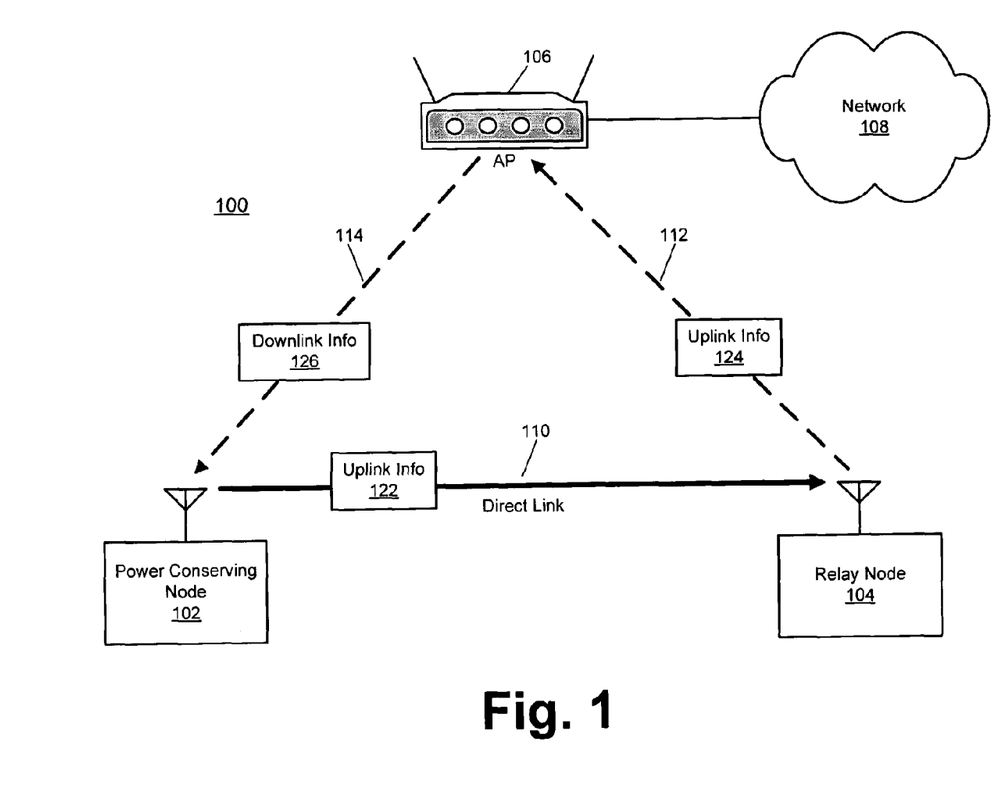
FIG. 1 is a schematic diagram illustrating an exemplary wireless system in which various uplink relay techniques may be advantageously implemented in accordance with at least one embodiment of the present invention.

Referring now to FIG. 1, an exemplary system 100 employing one or more frame relay techniques disclosed herein is illustrated in accordance with at least one embodiment of the present invention. System 100 incorporates a general wireless network topology described in IEEE 802.11 and other wireless standards wherein one or more wireless devices are associated with at least one access point 106. Wireless devices include devices enabled to communicate wirelessly using one or more protocols. Such protocols may include, for example, the IEEE 802.11 protocols (802.11a/b/e/g/i), etc. Examples of wireless-nabled devices may include notebook (or "laptop") computers, handheld computers, desktop computers, workstations, servers, portable digital assistants (PDAs), cellular phones, etc. In the illustrated example, the wireless devices include a power conserving node (PCN) 102 and a relay node 104.

The access point 106 may be connected to an infrastructure network 108 or other network, such as, for example, the Internet, a local area network (LAN), a wide area network (WAN), and the like. Thus, nodes 102 and 104 may communicate with one or more networked devices on an infrastructure network via the access point 106. Moreover, the nodes 102 and 104 may communicate with each other via the access point 106 or, as discussed in greater detail below, via a wireless direct link 110 between the nodes 102 and 104. Exemplary techniques for establishing and maintaining a wireless direct link are described, for example, in U.S. Pat. Application No. 60/515,701, the entirety of which is incorporated by reference herein.

In conventional systems, a wireless device sends uplink information (e.g., a set of one or more frames) to another networked device by transmitting the uplink information to an access point. The access point then transmits the uplink information to its intended destination. If the intended network device is within the basic service set (BSS) of the access point, the access point may wirelessly transmit the frame to the network device. Alternatively, if the networked device is located on the infrastructure network to which the access point is connected, the access point may provide the frame to the infrastructure network for routing to the intended networked device.

However, by transmitting uplink information from a wireless device directly to an access point, the transmitting wireless device often consumes more power than necessary during the uplink transmission. To illustrate, the distance between the wireless device and the access point may require considerable transmit power to successfully transmit the uplink information. Additionally, the access point may have a lower maximum transmission rate than that available to the wireless device. As a result, it may take longer to transmit the uplink information, therefore consuming more power in the process.

Accordingly, the present invention provides a technique for reducing the transmit power of a transmitting wireless device. In at least one embodiment, the PCN 102 identifies and selects a suitable relay node 104 for use in relaying uplink information 122 (e.g., one or more frames) to the access point 106, where the relay node 104 may be closer to the PCN 102, may have less interference, and/or is capable of supporting a higher transmit rate than the access point 106, thus reducing the transmit power consumed by the PCN 102. After identifying and selecting a suitable relay node 104, a direct wireless link 112 may be established between the PCN 102 and the relay node 104 and the direct wireless link 112 may be used to provide the uplink information 122 to the relay node 104 for relay to the access point 106. The relay node 104 may modify the uplink information 122 (e.g., by changing media access control (MAC) addresses in the frame headers) and transmit the modified uplink information 124 to the access point 106 using, for example, a conventional device-to-access point wireless link 112. However, because conserving transmit power at the access point 106 typically is not a serious issue and because the power consumed in receiving downlink information 126 is substantially constant regardless of the distance and/or transmit rate, the PCN 102 may receive the downlink information 126 directly from the access point 106 via the conventional wireless link 114. The downlink information 126 may have the PCN 102 as a destination. However, in certain instances, it may be preferable to relay the downlink information 126 from the access point 106 to the PCN 102 via the relay node 104 or one or more other wireless device.

Thus, by transmitting uplink information 122 to a relay node 104 that is closer (or having less interference) than the access point 106, or capable of supporting a higher transmit rate, the PCN 102 consumes less transmit power than if the uplink information 122 were to be transmitted directly to the access point 106 via a conventional device-to-access point wireless link 112. The exemplary relay techniques are described in greater detail with reference to FIGS. 2-4.

Figure 2:
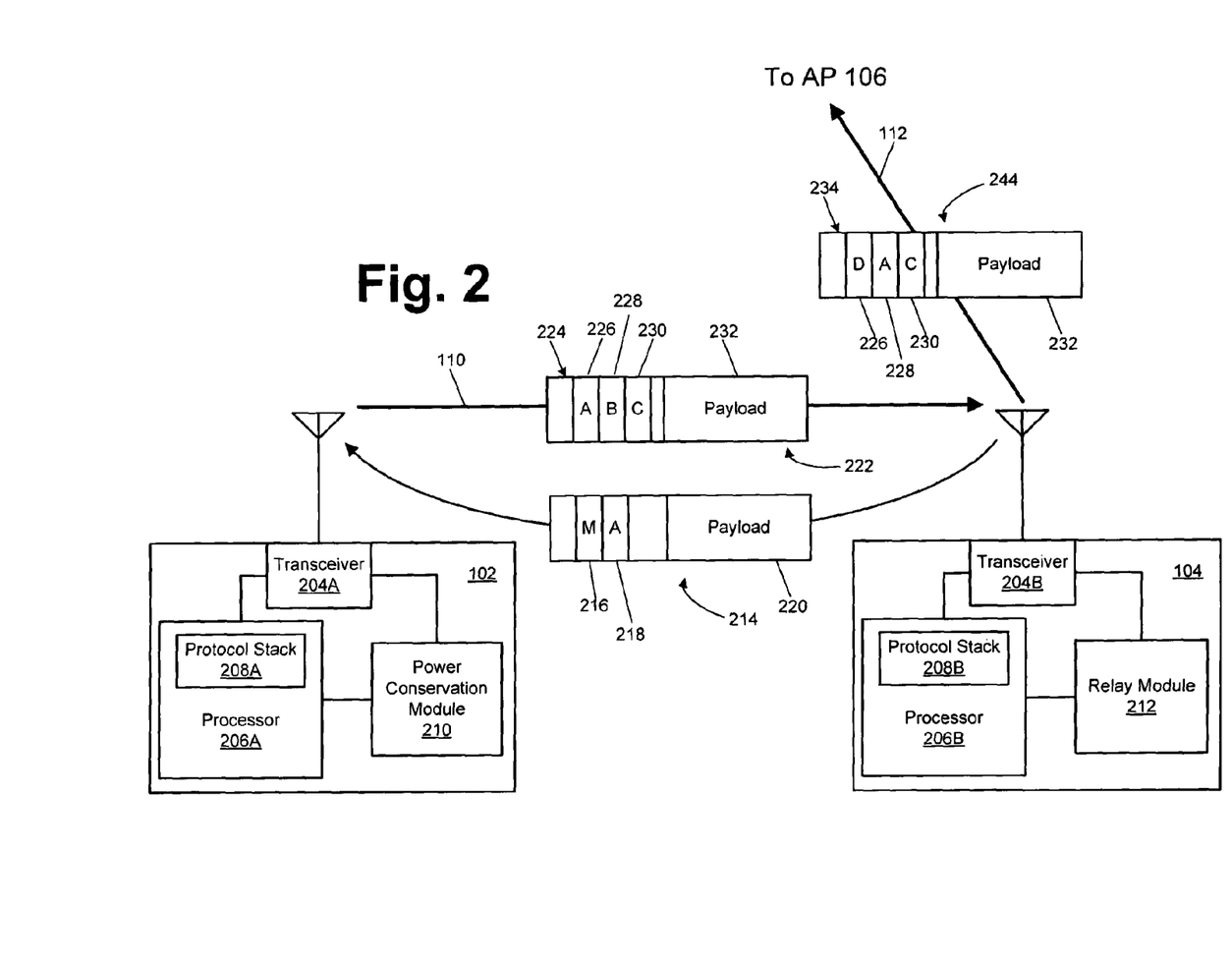
FIG. 2 is a schematic diagram illustrating the exemplary wireless system of FIG. 1 in greater detail in accordance with at least one embodiment of the present invention.
Figure 3:
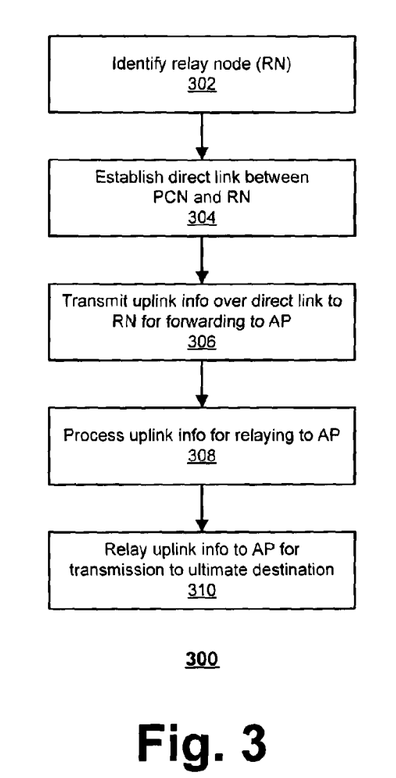
FIG. 3 is a flow diagram illustrating an exemplary method for relaying uplink information in accordance with at least one embodiment of the present invention.
Figure 4:
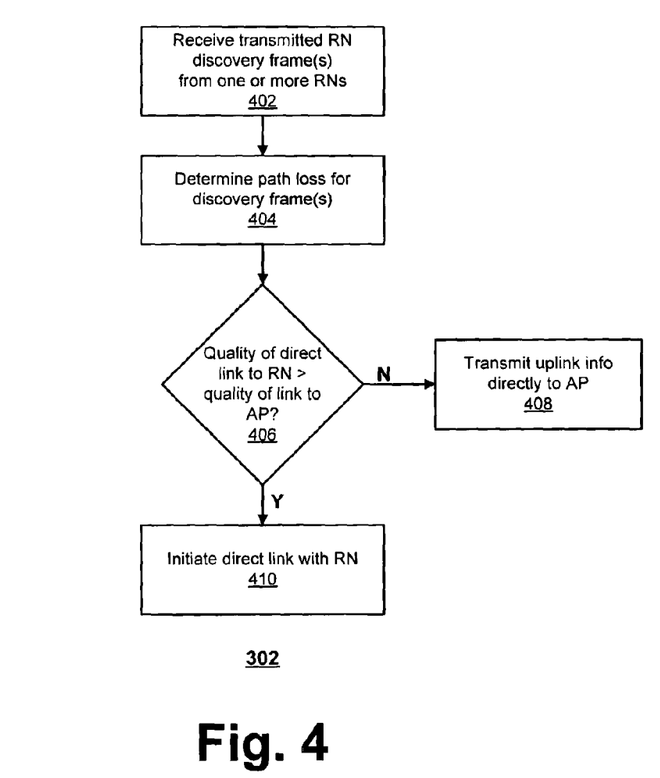
FIG. 4 is a flow diagram illustrating an exemplary method for identifying a suitable relay node in accordance with at least one embodiment of the present invention.

Referring now to FIGS. 2-4, exemplary configurations of the PCN 102 and relay node 104, as well as an exemplary method 300 of their operation, are illustrated in accordance with at least one embodiment of the present invention. Although PCN 102 is described herein as the transmitting device and relay node 104 is described as the relaying device, the PCN 102 may act as a relay node for relay node 104 or another wireless device and the relay node may act as a PCN. Accordingly, those skilled in the art will appreciate that a wireless device may implement some or all of the features of both the PCN 102 and the relay node 104 such that the wireless device is enabled to both identify, select and use one or more relay nodes to conserve transmit power, as well as relay uplink information for another wireless device.

In the illustrated example of FIG. 2, the PCN 102 includes at least a transceiver 204A for transmitting and/or receiving signals, one or more processors 206A and protocol stacks 208A for processing and otherwise preparing information for a transmission via the transceiver 204A, as well as for processing information received via the transceiver 204A. The PCN 102 further may include a power conservation module 210 for identifying and selecting a suitable relay node (e.g., relay node 104) for relaying uplink information 122, establishing and/or maintaining a direct link 110 with the identified relay node, and/or managing the transmission of the uplink information 122 to the selected relay node via the direct link 110. The power conservation module 210 may be implemented as software, hardware, firmware, or a combination thereof. To illustrate, the power conservation module 210 may be implemented as a software component of the protocol stack 208A, as a separate software program or module executed by the processor 206A, or as a software or hardware component implemented as part of the transceiver 204A.

As with the PCN 102, the relay node 104 includes a transceiver 204B for transmitting and/or receiving signals to and from other wireless devices and a processor 206B and protocol stack 208B for processing received information and information to be transmitted. The relay node 104 further may include a relay module 212 for relaying uplink information from the PCN 102, as well as for identifying itself to the PCN 102 as a relay node as discussed below with reference to FIG. 4. The relay module 212 may be implemented as software, hardware, firmware, or a combination thereof, and may be implemented as a part of the transceiver 204B, the protocol stack 208B, a software program or module executed by the processor 206B, as a separate hardware or software component, and the like.

As noted above, a conventional wireless device typically transmits uplink information directly to an access point. However, the access point may be at a significant distance and/or may have a relatively low supported receive rate. Thus, to economize power consumption when transmitting the uplink information, in at least one embodiment, the PCN 102 is adapted to identify a relay node suitable to relay uplink information from the PCN 102 to the access point 106 at step 302 of method 300 (FIG. 3). Generally, a relay node is suitable if the transmission of uplink information 122 to the relay node consumes less power at the PCN 102 than the transmission of the uplink information 122 directly to access point 106. Factors which may be considered by the PCN 102 in determining the suitability of a relay node include the distance/interference between the PCN 102 and the relay node in comparison with the distance/interference between the PCN 102 and the access point 106, the maximum receive rate supported by the relay node in comparison with the maximum receive rate supported by the access point 106 (subject to the maximum transmit rate supported by the PCN 102), and the like. An exemplary method for identifying and selecting a suitable relay node is discussed below with reference to FIG. 4.

Once a suitable relay node 104 is selected, a direct wireless link 110 may be established between the PCN 102 and the relay node 104 at step 304. Any of a variety of techniques for establishing a direct wireless link may be implemented, such as by using the Direct Link Protocol (DLP) technique described in U.S. patent application Ser. No. 10/353,391 referred to above and incorporated by reference above. The direct wireless link 110 may be initiated by either the PCN 102 or the relay node 104.

At step 306, the uplink information 122 (FIG. 1) may be transmitted to the relay node 104 via the direct wireless link 110. For ease of discussion, the uplink information 122 is illustrated as a data frame 222 including a header 224 and payload 232, where the header 224 has, for example, a source address field 226, an intermediary address field 228 and a destination address field 230. The address fields 226-230 may include any of a variety of address formats used to route frames, such as, for example, a media access control (MAC) address or an Internet Protocol (IP) address. In at least one embodiment, the source address field 226, the intermediary address field 228, and the destination address field 230 respectively include the address A of the PCN 102, the address B of the relay node 104, and the address C of the networked device for which the frame 222 is intended (i.e., the destination of the frame 222). The networked device may include a device on the network 108 or other network, another wireless device in the BSS serviced by the access point 106, and the like.

At step 308, the frame 222 is received by the transceiver 204B of the relay node 104 and provided to the processor 206B, the protocol stack 208B and/or the relay module 212 for processing. Part of this processing may include determining whether the relay node 104 is the destination of the frame 222 or whether the relay node 104 is to act as an intermediary for the frame 222. Accordingly, the relay module 212 (or protocol stack 208B) may compare the address in the destination address field 230 with the address of the relay node 104. If the comparison reveals that the relay node 104 is not the destination of the frame 222, the relay node 104 may prepare to relay the frame 222 to the access point 106. As part of this processing, the relay module 212 may modify the header 224 by replacing the address B of the relay node 104 in the intermediary address field 228 with the address D of the access point 106. At step 310, resulting modified header 234 and the payload 232 may be transmitted to the access point 106 as a modified frame 244 via the device-to-access point link 112. Upon receipt of the modified frame 244, the access point 106 may process the frame 244 as necessary and forward it to the intended networked device (e.g., a device on network 108), as indicated by address C in the destination address field 230.

Referring now to FIG. 4, an exemplary implementation of step 302 of method 300 (FIG. 3) for identifying a wireless device that is suitable to act as a relay node for another wireless device is illustrated in accordance with at least one embodiment of the present invention. Step 302 begins at substep 402, the relay module 212 or one or more potential relay nodes 104 may initiate the broadcast of a relay node discovery frame 214 (illustrated with reference to FIG. 2). The relay node discovery frame 214 may include a broadcast or multicast address M in destination address field 216 and the address B of the relay node 104 in the source address field 218. Moreover, the relay node discovery frame 214 may include an indication of the transmit power (e.g., a value in decibels (dB)) used to broadcast the frame 214, where this indication may be stored in a header or payload 220 of the relay node discovery frame 214. The payload 220 may further include an indication of a maximum transmit rate supported by the relay node 104.

Upon receipt of a relay node discovery frame 214 from a relay node 104, the power conservation module 210 of the PCN 102 may determine the received signal strength of the frame 214 as it is received by the transceiver 204A. At substep 404, the power conservation module 210 may determine a path loss associated with the relay node 104, where the path loss represents the difference between the transmit power of the relay node discovery frame 214 (as indicated in the frame 214) and the received signal strength. An identifier associated with the relay node 104 (e.g., the address of the relay node), its corresponding path loss and its maximum supportable transmit rate may be added to a list or table maintained by the power conservation module 210. The list or table may be updated upon reception of subsequent relay node discovery frames 214 from the relay node 104.

At substep 406, the power conservation module 210 determines whether there is a relay node available to relay uplink information 122 and further whether it would require less transmit power to use this relay node than it would to transmit the uplink information 122 directly to the access point 106. Accordingly, the power conservation module 210 may determine and compare the quality of link between the PCN 102 and the access point 106 to the quality of one or more direct links (established or to be established) between the PCN 102 and one or more relay nodes 104. In at least one embodiment, the quality of a link is based at least in part on the path loss, the maximum supported transmit rate, or a combination thereof. If more than one relay node 104 is maintained in the list or database of relay nodes, the power conservation module 210 may select a relay node having the highest link quality for comparison with the access point's link quality.

If the power conservation module 210 determine that less transmit power would be consumed by transmitting directly to the access point 106 at substep 406, the uplink information 122 may be transmitted directly to the access point 106 via the link 114 (FIG. 1) at substep 408. However, if the power conservation module 210 determines that transmit power would be conserved by relaying uplink information via a selected relay node 104, at substep 410 a direct wireless link 110 may be established between the PCN 102 and the selected relay node 104 (if not already established) and the uplink information 122 may be transmitted to the selected relay node 104 via the direct wireless link 110 for relay to the access point 106 as described above.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A method comprising:
   determining, at a wireless device, whether there is an advantage to transmitting a data frame to an access point via a relay node over transmitting the data frame directly from the wireless device to the access point, wherein said determining whether there is the advantage comprises:
   receiving, at the wireless device, a relay node frame from the relay node indicating that the relay node is available to relay frames to the access point and including information identifying an associated transmit power level used to transmit the relay node frame; and
   determining a difference between the transmit power identified in the relay node frame and a power level measured during reception of the relay node frame;
   in response to a determination that there is the advantage to transmitting the data frame to the access point via the relay node, establishing a direct wireless link between the wireless device and the relay node; and
   transmitting the data frame from the wireless device to the relay node for further transmission to the access point, wherein the data frame comprises routing information including a source address field, an intermediate address field including an address of the relay node, and a destination address field including an address of an ultimate destination device, and wherein the ultimate destination device is not the relay node.

2. The method of claim 1, wherein the relay node is determined to have a lower path loss than other nodes from which other relay node frames have been received.

3. The method of claim 1, wherein said determining whether there is the advantage comprises determining if there is less interference between the relay node and the access point or between the wireless device and the access point.

4. The method of claim 1, wherein said determining whether there is the advantage comprises determining if the relay node supports a higher data transfer rate than the access point.

5. The method of claim 1, wherein said determining whether there is the advantage comprises determining whether transmission of the data frame from the wireless device to the relay node requires less power than transmission of the data frame directly from the wireless device to the access point.

6. An apparatus comprising:
   a processor configured to:
   determine whether there is an advantage to transmitting a data frame to an access point via a relay node over transmitting the data frame directly to the access point, wherein to determine whether there is the advantage, the processor is configured to:
   receive a relay node frame from the relay node indicating that the relay node is available to relay frames to the access point and including information identifying an associated transmit power level used to transmit the relay node frame; and
   determine a difference between the transmit power identified in the relay node frame and a power level measured during reception of the relay node frame; and
   in response to a determination that there is the advantage to transmitting the data frame to the access point via the relay node, establish a direct wireless link between the wireless device and the relay node; and
   a transceiver configured to transmit the data frame to the relay node for further transmission to the access point, wherein the data frame comprises routing information including a source address field, an intermediate address field including an address of the relay node, and a destination address field including an address of an ultimate destination device, and wherein the ultimate destination device is not the relay node.

7. The apparatus of claim 6, wherein the relay node is determined to have a lower path loss than other nodes from which other relay node frames have been received.

8. The apparatus of claim 6, wherein the processor is further configured to determine if there is less interference between the relay node and the access point or between the apparatus and the access point.

9. The apparatus of claim 6, wherein the processor is further configured to determine if the relay node supports a higher data transfer rate than the access point.

10. The apparatus of claim 6, wherein the processor is further configured to determine whether transmission of the data frame from the apparatus to the relay node requires less power than transmission of the data frame directly from the apparatus to the access point.

11. An article of manufacture including a non-transitory computer-readable medium having instructions stored thereon, the instructions comprising:
   instructions to determine, at a wireless device, whether there is an advantage to transmitting a data frame to an access point via a relay node over transmitting the data frame directly from the wireless device to the access point, wherein the instructions to determine whether there is the advantage comprise:
      instructions to receive a relay node frame from the relay node indicating that the relay node is available to relay frames to the access point and including information identifying an associated transmit power level used to transmit the relay node frame; and
      instructions to determine a path loss to the relay node from the received relay node frame, wherein the path loss is based at least in part on a difference between the transmit power identified in the relay node frame and a power level measured during reception of the relay node discovery frame;
   in response to a determination that there is the advantage to transmitting the data frame to the access point via the relay node, instructions to establish a direct wireless link between the wireless device and the relay node; and
   instructions to transmit the data frame to the relay node for further transmission to the access point, wherein the data frame comprises routing information including a source address field, an intermediate address field including an address of the relay node, and a destination address field including an address of an ultimate destination device, and wherein the ultimate destination device is not the relay node.

12. The article of manufacture of claim 11, wherein the relay node is determined to have a lower path loss than other nodes from which other relay node frames have been received.

13. The article of manufacture of claim 11, wherein the instructions to determine whether there is the advantage comprise instructions to determine if there is less interference between the relay node and the access point or between the wireless device and the access point.

14. The article of manufacture of claim 11, wherein the instructions to determine whether there is the advantage comprise instructions to determine if the relay node supports a higher data transfer rate than the access point.

15. The article of manufacture of claim 11, wherein the instructions to determine whether there is the advantage comprise instructions to determine whether transmission of the data frame from the wireless device to the relay node requires less power than transmission of the data frame directly from the wireless device to the access point.

* * * * *

UNITED STATES PATENT AND TRADEMARK OFFICE
CERTIFICATE OF CORRECTION

| | | |
|---|---|---|
| PATENT NO. | : 8,446,933 B2 | Page 1 of 1 |
| APPLICATION NO. | : 13/271394 | |
| DATED | : May 21, 2013 | |
| INVENTOR(S) | : Wentink | |

It is certified that error appears in the above-identified patent and that said Letters Patent is hereby corrected as shown below:

On the Title Page, in Item [75], under "Inventor", in Column 1, Line 1, delete "Ultrecht" and insert -- Utrecht --, therefor.

On Title Page 3, in Item [56], under "OTHER PUBLICATIONS", in Column 1, Line 4, delete "LANS," and insert -- LANs, --, therefor.

On Title Page 3, in Item [56], under "OTHER PUBLICATIONS", in Column 2, Line 31, delete "Allowanceon" and insert -- Allowance on --, therefor.

In the Specifications

Column 3, Line 57, delete "wireless-nabled" and insert -- wireless-enabled --, therefor.

Column 4, Lines 42-43, delete "direct wireless link 112" and insert -- direct wireless link 110 --, therefor.

Column 4, Line 44, delete "direct wireless link 112" and insert -- direct wireless link 110 --, therefor.

In the Claims

Column 8, Line 54, in Claim 6, delete "frame:" and insert -- frame; --, therefor.

Signed and Sealed this
Sixth Day of May, 2014

Michelle K. Lee
*Deputy Director of the United States Patent and Trademark Office*